J. G. LANE & W. J. LANE.
Improvement in Grinding Mills.
No. 125,399.  Patented April 9, 1872.
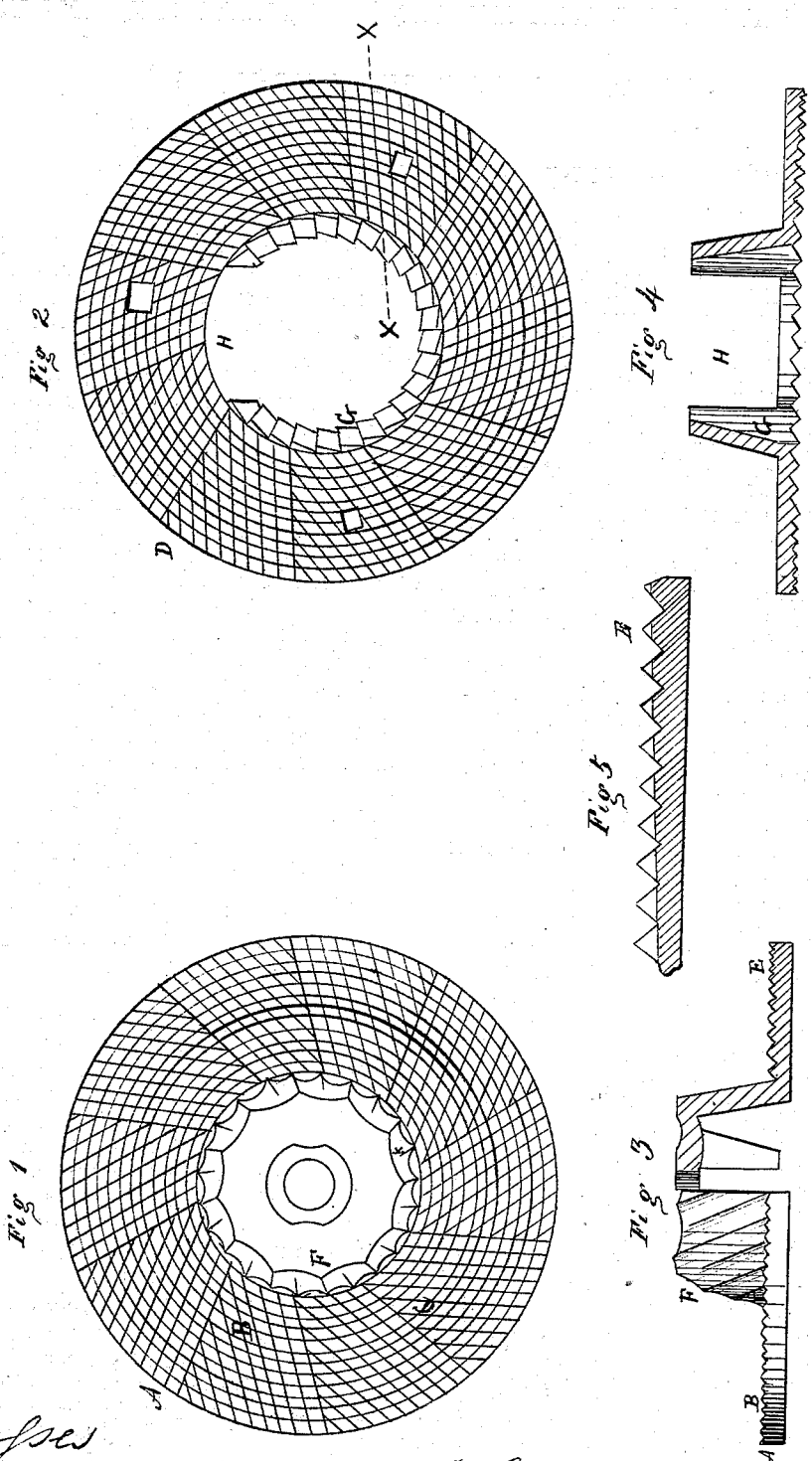

125,399

UNITED STATES PATENT OFFICE.

JOHN G. LANE AND WILLIAM J. LANE, OF MILLBROOK, NEW YORK.

IMPROVEMENT IN GRINDING-MILLS.

Specification forming part of Letters Patent No. 125,399, dated April 9, 1872.

*To all whom it may concern:*

Be it known that we, JOHN G. LANE and WILLIAM J. LANE, both of Millbrook, Dutchess county, and State of New York, have invented certain new and useful Improvements in Grinding-Mills; and we do hereby declare that the following description and accompanying drawing are sufficient to enable any person skilled in the art to which it most nearly appertains to make and use our said improvements without further invention or experiment.

The nature of our invention consists in the particular construction and arrangement of devices described in the following specification and represented in the drawing.

In the accompanying drawing, Figure 1 shows the inside of the revolving plate of the mill; Fig. 2, the inside of the stationary plate. The left-hand half of Fig. 3 is an elevation, and the right-hand half a section of Fig. 1. Fig. 4 is a section of Fig. 2. Fig. 5 is an enlarged sectional view on the line *x x* of Fig. 2, showing that the tangential grooves decrease in depth toward the periphery.

In the accompanying drawing, A is a circular cast-iron plate, about ten inches in diameter and three-sixteenths of an inch thick, with teeth on one side about three-sixteenths of an inch high, of a pyramidal form, with a rhomboidal base, terminating in a vertex, B B. These teeth are formed by turning grooves in the face of the plate with a tool having a V-shaped point, so as to form V-shaped grooves C with V-shaped ribs between them. We then lay off the plate in an eight-quarter dress, as shown in Figs. 1 and 2, and draw a circle two and one-half inches in circumference, and draw tangential lines from the circumference of this circle to eight points on the circumference of plate, and make V-shaped grooves parallel to these tangential lines on each of the eight-quarters or portions of the plate. The circular grooves on one plate are opposite the circular ribs on the other, so that the said ribs or rows of teeth on each plate fit into the grooves on the other plate, and the teeth on the rotating plate A, passing around between the teeth on the stationary plate D, cut, crush, or mash the grain, coffee, or spices as they work from the center to the circumference of the plates, where they are discharged pulverized or ground. The tangential grooves or furrows are made the same depth from the center out nearly to the circumference; but when these tangential grooves cross one, two, three, or more of the outer circles, they are made of less depth, as shown at E, Figs. 3 and 5, so as to grind or pulverize the material being ground finer than it would do if the tangential grooves were made the same depth of the circular grooves entirely to the circumference of the plates. This is a very great and important advantage, as it enables the mill to make either fine or coarse meal or flour, accordingly as the plates are set near together or far apart. The centers of the circular grooves are about one-fifth of an inch from center to center, and the tangential grooves about one-fourth of an inch from center to center. A space about two and a half inches around the outer portion of the plates is allotted to the teeth above described, and in the center is a conical hub or boss, F, about two inches high, provided with inclined grooves one-fourth of an inch deep and three-fourths of an inch wide, forming teeth, as shown in Figs. 1 and 3, which teeth receive and break the grain against the teeth G on the inside of the hub of the stationary plate, Figs. 2 and 4, which teeth are made by grooves about one-third of an inch wide and one-eighth of an inch deep. The teeth on the hub F should be made to work about one-twelfth or one-sixteenth of an inch from the teeth G on the inside of the hub of the opposite plate. There is a space, H, in the side of the stationary plate for the grain to enter the mill from the hopper, arranged around the open space. The above-described plates may be made to work with either a horizontal or vertical shaft, as may be preferred.

Claim.

In combination with mill-plates, with concentric rings of teeth fitted to rotate between each other, as shown and described, we claim tangential or radial grooves made shallower as they approach the periphery of the plates.

JOHN G. LANE.
W. J. LANE.

In presence of—
H. T. TRIPP,
JOSPH. BARTLETT.